Patented June 29, 1937 2,085,428

UNITED STATES PATENT OFFICE 2,085,428

METHOD OF MAINTAINING OR INVIGORATING CULTURES OF BUTYL MICRO-ORGANISMS

Charles T. Hanson, Baltimore, Md., assignor to U. S. Industrial Alcohol Co., New York, N. Y., a corporation of West Virginia No Drawing. Application February 25, 1935, Serial No. 8,220

6 Claims. (Cl. 195—78)

The object of this invention is to maintain a supply of active micro-organisms of the kind used in industrial fermentation processes for the production of butyl alcohol and other solvents.

Such organisms are isolated from natural sources originally, but it is usually necessary to institute a prolonged search for the exact type necessary or advantageous for a given process. The source is often given as grain. The fact is that these organisms have their natural habitat in the soil, and may, therefore, be found on materials that have been in contact with the soil.

It is a well-known fact that bacteria, cultured over a long period in the laboratory in the pure form, may change their characteristics. Thus, a lowering of fermentative activity is apt to take place in the case of butyl organisms employed industrially. After prolonged storage on artificial media the organisms are apt to fail to break down the acids, which are the normal products of the first portion of the fermentation, to solvents which are the normal products of the second portion of the fermentation. Also, the organism loses its mobility and ability to multiply under plant conditions. This may be stated in a general way by saying that it becomes sensitive to unfavorable conditions. With these organisms experience has shown that the vigor of the culture is of prime importance especially for large operations carried out in the metal vessels necessarily used in an industrial plant. Consequently, when the culture becomes enfeebled, sufficiently satisfactory plant results are no longer obtained and it is necessary either to restore the vigor of the culture by some means or to institute a search for the same organism in nature as was done in its original isolation. This latter procedure is uncertain and may take a long time. It can not, therefore, be relied upon in daily practice.

Certain bacteriological manipulations, such as heat shocking and colony isolation, have been resorted to in order to bring up the strength of a weakened culture of butyl organisms, but experience has shown that these do not suffice when the culture has become definitely enfeebled.

In accordance with this invention, such cultures may be maintained, or, if weakened, their vigor may be restored, by placing a liberal quantity of inoculum of the organisms on a plot of open soil. In the latter case after a suitable period of time has elapsed, the butyl organisms of the type used in the inoculum may be reisolated from the plot and will be found to have regained their ability to carry through industrial fermentations. It has been found that a culture which showed the "phage sensitivity" before being put on the soil did not show this sensitivity after a period on the open soil. In either case, the inoculated area of soil serves as a reservoir of active bacteria from which the desired type may be isolated at will.

The re-invigoration of butyl cultures has been carried out as follows: A plot having been staked out on the open soil, a liquid, sporulated culture of the organism *Clostridium viscifaciens* described in Sherman and Erb Patent No. 2,017,572, dated October 15, 1935, weakened by prolonged growth on laboratory media, was poured thereon. This culture failed to give satisfactory commercial fermentations at the time it was placed on the soil. Reisolations from the inoculated soil made at intervals beginning after one month yielded cultures which had regained their vigor and were capable of satisfactory performance in the fermentation plant in the process of fermenting carbohydrate material to produce butyl alcohol and other solvents. Control isolations made from nearby uninoculated soil did not yield organisms which could be confused with *Clostridium viscifaciens* used in the inoculum. The cultural characteristics of the reisolated micro-organism were sufficiently typical to identify it as the organism that had been placed on the soil.

Where it is desired to maintain a culture which has not been carried on laboratory media long enough to become weakened, the same procedure is followed, but reisolations may be made at once if it is desired to do so.

It is a well-known fact that pathogenic organisms suffer a loss of virulence when carried for a long period of time on artificial culture media, and the loss of normal activity of butyl organisms may be analogous to this. This comparison may be carried further since weakened pathogenic organisms are restored to their original state by several passages through susceptible animals. The inoculation of open soil with the butyl organism may be considered analogous to this procedure.

The process of this invention is not to be confused with the known practice of storing cultures in sterile soil. Such a method of storage does not prevent the running down of cultures which have that tendency. Natural soil contains a large variety of other types of organisms, and an organism placed therein is affected by symbiotic relationships with other soil bacteria, as well as by other factors peculiar to a natural as opposed to an artificial environment. After strongly inoculating a plot of soil with the desired organism, there is no difficulty in reisolating the organism from the same place.

The term "butyl organisms" used herein is intended to include those that produce mainly butyl alcohol and isopropyl alcohol and those that produce mainly butyl alcohol and acetone.

I claim:

1. A method for increasing the fermentative vigor of weakened cultures of butyl organisms, which comprises placing an inoculum of a culture of the organism on unsterilized soil, and after a period of the order of a month making a reisolation of the organism from the inoculated soil.

2. A method for maintaining vigorous cultures of butyl organisms for an industrial fermentation process, which comprises inoculating unsterilized soil with the selected organism, reisolating the organism from the inoculated soil as required after a period of the order of a month, and culturing the same for use in the process.

3. A method for increasing the fermentative vigor of weakened cultures of Clostridium viscifaciens, which comprises placing an inoculum of a culture of the organism on unsterilized soil, and after a period of the order of a month making a reisolation of the organism from the inoculated soil.

4. A method for establishing a source of supply of Clostridium viscifaciens of good fermentative vigor, which comprises inoculating unsterilized soil with a sporulated culture of the said organism, so that by reisolation of the organism from this soil, after a period of the order of a month, cultures may be obtained as required for the purpose of fermenting carbohydrate material to produce butyl alcohol and other solvents.

5. A method for increasing the fermentative vigor of weakened cultures of butyl organisms, which comprises placing an inoculum of a culture of the organism on open soil, and after a suitable period of the order of a month making a reisolation of the organism from the inoculated soil.

6. A method for maintaining vigorous cultures of butyl organisms for an industrial fermentation process, which comprises inoculating open soil with the selected organism, reisolating the organism from the inoculated soil as required after a period of the order of a month, and culturing the same for use in the process.

CHARLES T. HANSON.